(12) United States Patent
Johnson

(10) Patent No.: US 8,967,216 B2
(45) Date of Patent: Mar. 3, 2015

(54) LINEAR FRICTION WELDER WITH HELICAL GROOVE

(75) Inventor: Stephen A. Johnson, South Bend, IN (US)

(73) Assignee: APCI, LLC, South Bend, IN (US)

( * ) Notice: Subject to any disclaimer, the term of this patent is extended or adjusted under 35 U.S.C. 154(b) by 554 days.

(21) Appl. No.: 13/309,054

(22) Filed: Dec. 1, 2011

(65) Prior Publication Data

US 2013/0139968 A1    Jun. 6, 2013

(51) Int. Cl.
B29C 65/06    (2006.01)

(52) U.S. Cl.
USPC ......... 156/367; 156/580; 156/73.5; 156/73.6; 228/2.1; 228/2.3; 228/112.1

(58) Field of Classification Search
USPC ........ 156/73.5, 73.6, 580; 228/2.1, 2.3, 112.1
See application file for complete search history.

(56) References Cited

U.S. PATENT DOCUMENTS

| | | |
|---|---|---|
| 3,058,513 A | 10/1962 | Schaub et al. |
| 3,388,849 A | 6/1968 | Blum et al. |
| 3,542,275 A | 11/1970 | Loyd et al. |
| 3,554,845 A | 1/1971 | Billett et al. |
| 3,591,068 A | 7/1971 | Farmer et al. |
| 3,671,049 A | 6/1972 | Stamm |
| 3,701,708 A | 10/1972 | Brown et al. |
| 3,791,569 A | 2/1974 | Mims |
| 3,822,821 A | 7/1974 | Clarke |
| 3,848,792 A | 11/1974 | Mims |
| 3,860,468 A | 1/1975 | Scherer |
| 3,920,504 A | 11/1975 | Shoh et al. |
| 3,972,465 A | 8/1976 | Takaoka et al. |
| 4,043,497 A | 8/1977 | Jones |
| 4,087,036 A | 5/1978 | Corbett et al. |
| 4,247,346 A | 1/1981 | Maehara et al. |

(Continued)

FOREIGN PATENT DOCUMENTS

| | | |
|---|---|---|
| DE | 102004016613 A1 | 11/2005 |
| EP | 0355867 A1 | 2/1990 |

(Continued)

OTHER PUBLICATIONS

International Search Report and Written Opinion in corresponding PCT application (i.e., PCT/US2012/067389), mailed Feb. 7, 2013 (7 pages).

(Continued)

*Primary Examiner* — George Koch
(74) *Attorney, Agent, or Firm* — Maginot, Moore & Beck, LLP

(57) ABSTRACT

A linear friction welding system includes a power shaft defining a power shaft axis and including a first eccentric portion and a first power transfer portion, a power transfer rod engaged with the first power transfer portion, an actuator assembly operably coupled with the power transfer rod and configured to move the power transfer rod axially along the power shaft axis, a crank including a second eccentric portion operably coupled with the first eccentric portion, and a second power transfer portion engaged with the power transfer rod, the linear friction welding system configured such that axial movement of the power transfer rod causes rotational movement of the crank with respect to the power shaft about the power shaft axis, a cam follower operably connected to an outer surface of the second eccentric portion, and a ram operably connected to the cam follower and configured to vibrate along a welding axis.

20 Claims, 13 Drawing Sheets

(56) References Cited

U.S. PATENT DOCUMENTS

| | | |
|---|---|---|
| 4,270,495 A | 6/1981 | Freudenstein et al. |
| 4,470,868 A | 9/1984 | MacLaughlin et al. |
| 4,552,609 A | 11/1985 | Larsen |
| 4,811,887 A | 3/1989 | King et al. |
| 4,858,815 A | 8/1989 | Roberts et al. |
| 4,905,883 A | 3/1990 | Searle |
| 4,995,544 A | 2/1991 | Searle |
| 5,100,044 A | 3/1992 | Searle |
| 5,141,591 A | 8/1992 | Boek et al. |
| 5,366,344 A | 11/1994 | Gillbanks et al. |
| 5,853,119 A | 12/1998 | Searle |
| 6,003,752 A | 12/1999 | Searle et al. |
| 6,102,272 A | 8/2000 | Searle et al. |
| 6,145,730 A | 11/2000 | Wiesemann |
| 6,328,087 B1 | 12/2001 | Finzo et al. |
| 6,357,506 B1 | 3/2002 | Nomura et al. |
| 6,688,512 B2 | 2/2004 | Trask |
| 7,882,996 B2 | 2/2011 | Alessi et al. |
| 8,070,039 B1 * | 12/2011 | Johnson et al. ............ 228/2.1 |
| 8,181,841 B2 * | 5/2012 | Johnson et al. ............ 228/2.1 |
| 8,376,210 B2 * | 2/2013 | Johnson et al. .......... 228/112.1 |
| 2004/0216432 A1 | 11/2004 | Lopez |
| 2004/0256439 A1 | 12/2004 | Pfeiler |
| 2006/0231593 A1 | 10/2006 | Bayer et al. |
| 2009/0145948 A1 | 6/2009 | Pfeiler |
| 2009/0321497 A1 | 12/2009 | Alessi et al. |
| 2011/0056629 A1 | 3/2011 | Kawaura et al. |

FOREIGN PATENT DOCUMENTS

| | | |
|---|---|---|
| EP | 0999133 A1 | 5/2000 |
| GB | 1332712 | 10/1973 |
| JP | 2002153975 A | 5/2002 |
| JP | 2009298411 A | 12/2009 |

OTHER PUBLICATIONS

Abstract, DE102004016613A1, Nov. 17, 2005.
Thompson Friction Welding, "Linear Friction Welding Becomes a Commercial Reality", Article, West Midlands, United Kingdom (5 pages), Feb. 2008.
TWI Knowledge Summary website page "Linear friction welding"; by Philip Threadgill, http://www.twi.co.uk/content/ksplt001.html; published at least as early as Oct. 21, 2009; (3 pages).
Addison, "Linear Friction Welding Information for Production Engineering," Research Report @ TWI Ltd., Jul. 2010, United Kingdom (34 pages).
Addison, "Linear Friction Welding Information for Production Engineering," Research Report © TWI Ltd., Jul. 2010, United Kingdom (46 pages).

* cited by examiner

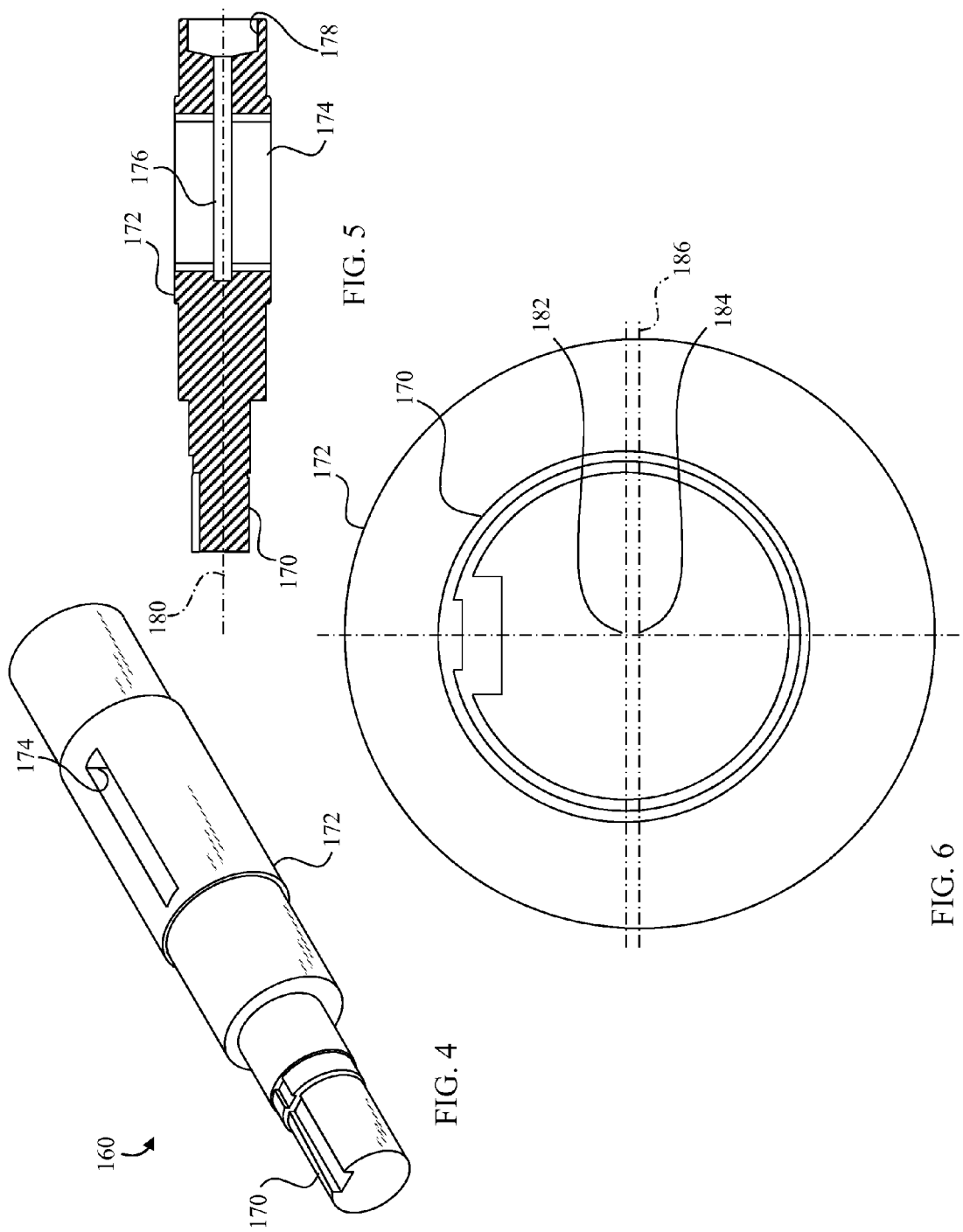

LINEAR FRICTION WELDER WITH HELICAL GROOVE

FIELD OF THE INVENTION

The present invention relates to linear friction welding.

BACKGROUND OF THE INVENTION

Friction welding (FW) is a process of joining two components which may be made from the same or different materials. The FW process typically involves pressing one of the two components against the other component with a large amount of force and rapidly moving one of the two components with respect to the other component to generate friction at the interface of the two components. The pressure and movement generate sufficient heat to cause the components to begin to plasticize. Once the two components are plasticized at the contact interface, the relative movement of the two components is terminated and an increased force is applied. As the components cool in this static condition, a weld is formed at the contact interface.

The weld obtained using FW is a solid state bond which is highly repeatable and easily verifiable. For example, the amount of material donated by each component to the formation of the weld, which is referred to as "upset", is well defined. Therefore, by carefully controlling the energy input into the FW system in the form of friction and forging pressure, the measured upset of a welded assembly provides verification as to the nature of the weld obtained.

As discussed above, relative movement of the two components is a critical facet of FW. Different approaches have been developed to provide the required relative movement. One widely used approach is rotational friction welding (RFW). RFW involves rotation of one component about a weld axis. RFW provides many benefits and is thus a favored welding approach in various industries including aerospace and energy industries.

RFW, however, does have some limitations. For example, in forming a weld, the interface between the two components must be evenly heated to generate a uniform plasticity within each of the components throughout the weld interface. If one area becomes hotter than another area, the material in that hotter area will be softer, resulting in an incongruity in the formed weld. To provide consistent heat generation throughout the component interface, the rotated component is necessarily uniformly shaped about the axis of rotation, i.e., circular. Moreover, since the heat generated is a function of the relative speed between the two materials, more heat will be generated toward the periphery of the rotated component since the relative speed at the periphery is higher than the relative speed at the rotational axis.

In response to the limitations of RFW, linear friction welding (LFW) was developed. In LFW, the relative movement is modified from a rotational movement to a vibratory movement along a welding axis. By controlling the amplitude and the frequency of the linear movement, the heat generated at the component interface can be controlled.

LFW thus allows for welding of a component that exhibits substantially uniform width. LFW, like RFW, is subject to various limitations. One such limitation is that LFW exhibits non-uniform heating along the welding axis due to the linear movement of the vibrated component. For example, when welding two components of identical length along the welding axis, the two components are aligned in the desired as-welded position. Due to the nature of previous LFW systems, this location corresponds to the rearmost position of the component which is moved. The leading edge of the vibrated component is then moved beyond the corresponding edge of the stationary component by a distance equal to the amplitude of the vibration. Moreover, the trailing edge of the vibrated component exposes a portion of the stationary component as the leading edge of the vibrated component moves beyond the corresponding edge of the stationary component. Accordingly, the portion of the vibrating component that moves beyond the corresponding edge of the stationary component and the exposed portion of the stationary component will not be heated at the same rate as the remaining surfaces at the component interface. Therefore, manufacturing process must take the incongruity of the welds into account such as by machining off a portion of the welded components at the leading edge and the trailing edge of the formed weld.

Moreover, in order to achieve the frequency and amplitude necessary to realize a weld, a LFW device must provide for rapid acceleration from a dead stop. The moving component must then be completely stopped and reaccelerated in a reverse direction. As the size of the vibrated component increases, the momentum that must be controlled becomes problematic. Thus, traditional LFW devices incorporate massive components which are very expensive.

A related limitation of LFW processes is that the relative motion between the two components must be terminated in order for the weld to form properly. Merely removing the motive force does not remove the momentum of the vibrated component. Additionally, any "rebound" or damped vibrations of the moving component as it is immobilized weakens the final weld since the plasticized metals begin to cool as soon as the vibrating movement is reduced.

One approach to solving the need to rapidly immobilize the moving component is to jam the motion-inducing system such as by forcibly inserting a device into the motion inducing system. Freezing the system in this fashion can provide the desired stopping time. This approach, however, results in significant forces being transmitted through the system, necessitating oversized components to be able to withstand the shock. Moreover, the exact position of the vibrated component with respect to the stationary component is not known. Therefore, manufacturing processes must account for a possible position error potentially equal to the amplitude of vibration.

Therefore, a LFW system and method which provides consistent welds is beneficial. A LFW system and method which allows for smaller components within the system would be beneficial. A LFW system and method which reduce the errors associated with the LFW process would be further beneficial.

SUMMARY OF THE INVENTION

The present invention in one embodiment is directed to a linear friction welding system includes a power shaft defining a power shaft axis and including a first eccentric portion and a first power transfer portion, a power transfer rod engaged with the first power transfer portion, an actuator assembly operably coupled with the power transfer rod and configured to move the power transfer rod axially along the power shaft axis, a crank including a second eccentric portion operably coupled with the first eccentric portion, and a second power transfer portion engaged with the power transfer rod, the linear friction welding system configured such that axial movement of the power transfer rod causes rotational movement of the crank with respect to the power shaft about the power shaft axis, a cam follower operably connected to an outer surface of the second eccentric portion, and a ram operably connected to the cam follower and configured to vibrate along a welding axis.

In another embodiment, a system includes a power shaft defining a power shaft axis and including a first eccentric portion, a crank including a second eccentric portion coupled with the first eccentric portion, a ram operably coupled with the second eccentric portion and defining a welding axis, a memory including program instructions, and a controller operably connected to the memory, and configured to execute the program instructions to control the phased relationship between the first eccentric portion and the second eccentric portion such that the ram does not vibrate along the welding axis while the power shaft is rotating by axially positioning a power transfer rod coupled to the power shaft and the crank along the power shaft axis, establish a first pressure between two components to be welded after controlling the phased relationship such that the ram does not vibrate, and modify the phased relationship such that the ram vibrates along the welding axis after the first pressure has been established.

The above described features and advantages, as well as others, will become more readily apparent to those of ordinary skill in the art by reference to the following detailed description and accompanying drawings.

BRIEF DESCRIPTION OF THE DRAWINGS

The present invention may take form in various system and method components and arrangement of system and method components. The drawings are only for purposes of illustrating exemplary embodiments and are not to be construed as limiting the invention.

FIG. 4 depicts a perspective view of the power shaft of FIG. 3;

FIG. 5 depicts a side cross-sectional view of the power shaft of FIG. 3 showing a planar power transfer portion slot and an actuator rod receiving cavity;

FIG. 6 depicts a plan view of the shaft of FIG. 3 showing the origin of the eccentric portion with respect to the origin of the coupling portion with the shaft in a zero degree position;

DESCRIPTION

Figure 1:
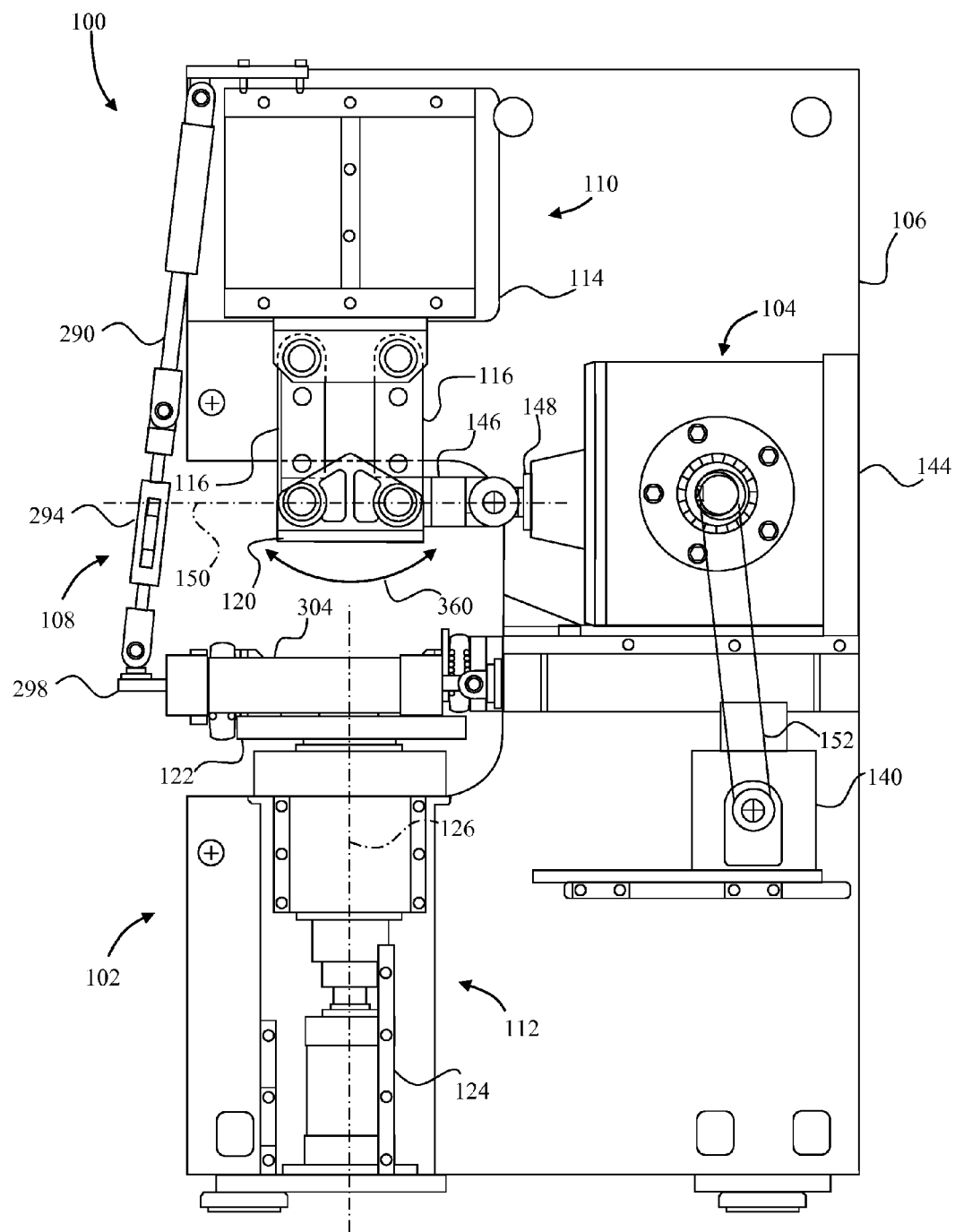
FIG. 1 depicts a partial side cutaway plan view of a linear friction welding system in accordance with principles of the invention.

Referring to FIG. 1, a linear friction welding system 100 includes a pressing assembly 102, a vibrating assembly 104, and a stiffening assembly 108, each of which are supported by a frame 106. The pressing assembly 102 includes an upper assembly 110 and a lower assembly 112. The upper assembly 110 includes a base 114 and two rocker arm pairs 116 and 118 (see also FIG. 2) supporting a carriage 120.

Figure 2:
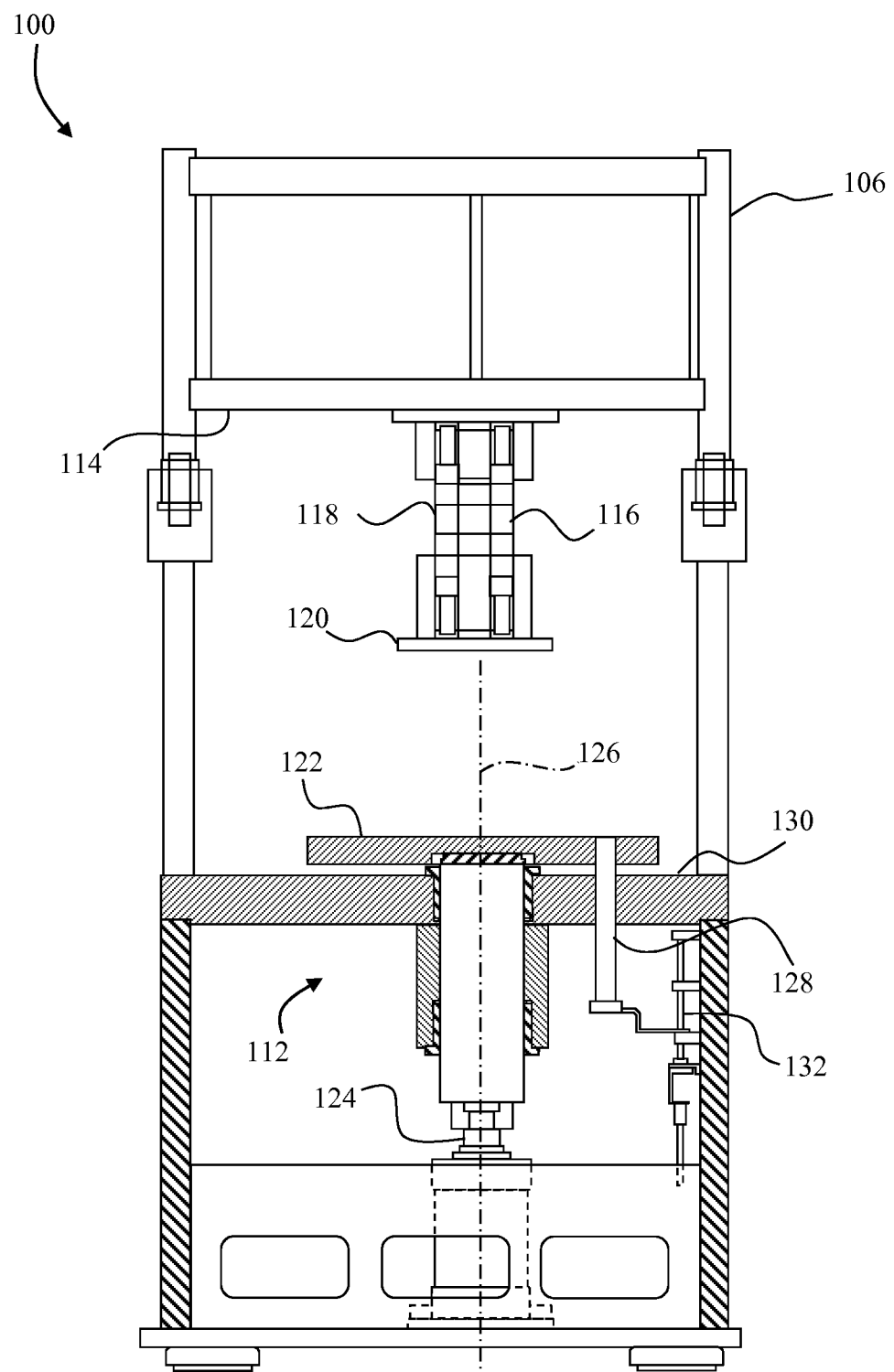
FIG. 2 depicts a partial front cross-sectional view of the system of FIG. 1.

Continuing with FIG. 2, the lower assembly 112 is generally aligned with the carriage 120 and includes a forge platen 122 supported above a main hydraulic press 124. The main hydraulic press 124 defines a press axis 126. An anti-rotation rod 128 extends from the forge platen 122 through a lower support plate 130. A sensor 132 is associated with the anti-rotation rod 128. In one embodiment, the sensor 132 is a linear voltage displacement transducer (LVDT).

Returning to FIG. 1, the vibrating assembly 104 includes a motor 140, a cam assembly 144, and a ram 146. The ram 146 is rigidly connected to the carriage 120 at a forward end and is pivotally connected to the cam assembly 144 at the opposite end through a connecting rod 148. The ram 146 is configured for movement along a weld axis 150. The motor 140 is connected to the cam assembly 144 through a belt 152.

Figure 3:
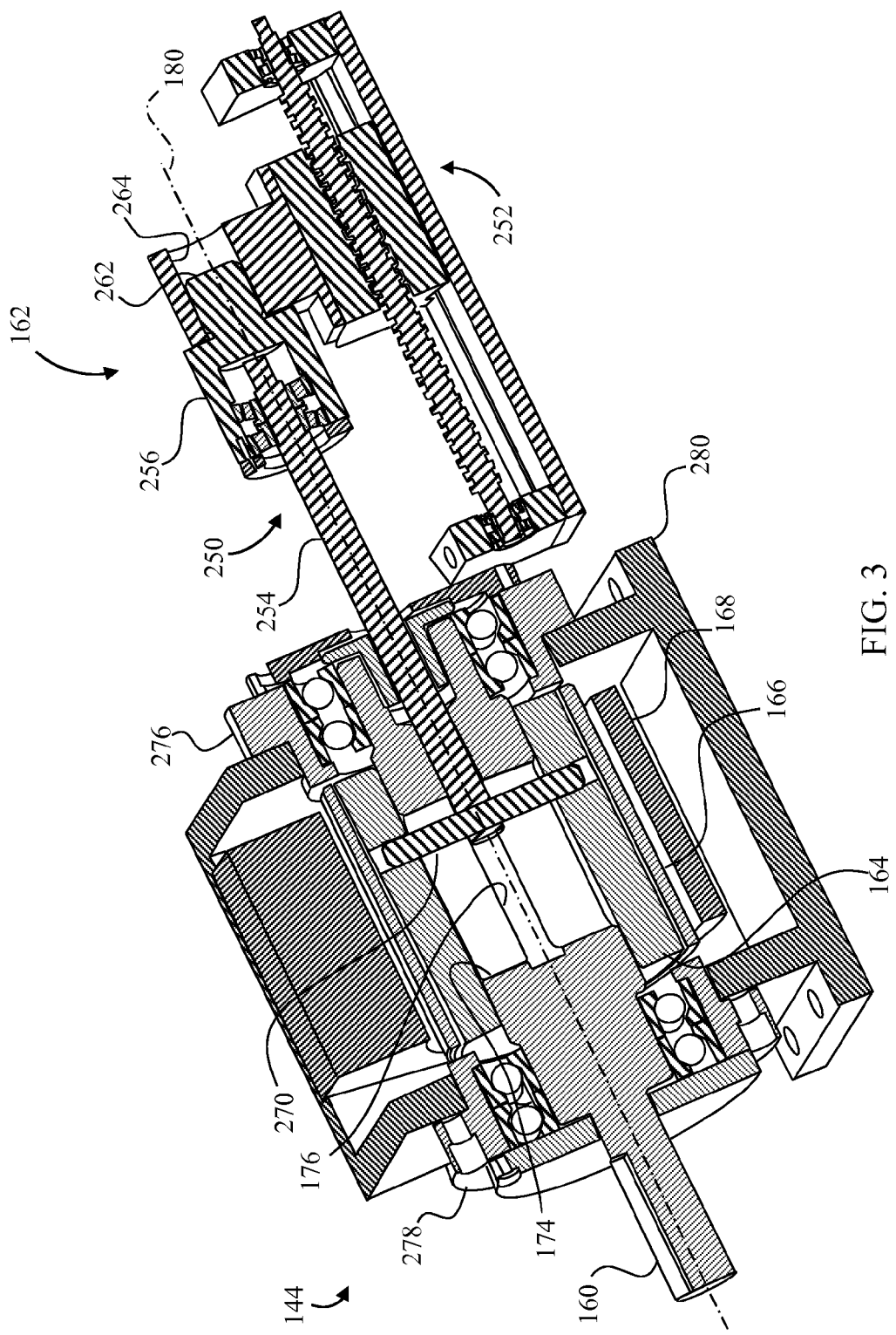
FIG. 3 depicts a perspective cross-sectional view of the vibrating system of the linear friction welding system of FIG. 1 depicting an eccentric portion of an inner power shaft positioned within a crank which includes an eccentric portion and two generally helical grooves used to establish a system phase angle.
Figure 7:
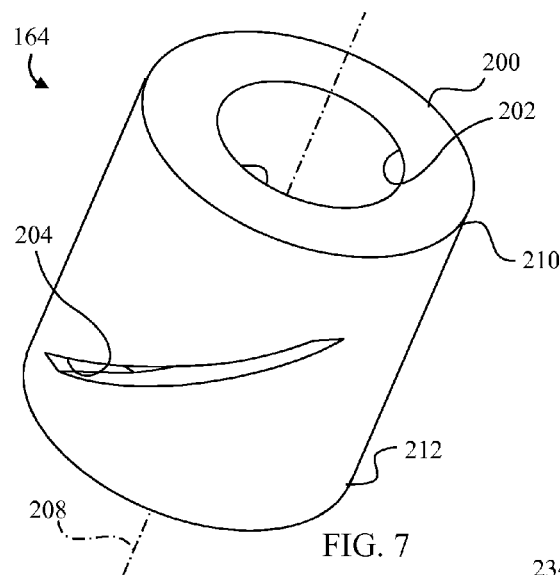
FIG. 7 depicts a perspective view of the crank of FIG. 3.

The cam assembly 144, shown in additional detail in FIG. 3, includes a power shaft 160, an actuator assembly 162, a crank 164, a retaining sleeve 166, and a cam follower 168. The cam follower 168 is pivotably connected to the connecting rod 148 (this pivoting connection is not shown in the drawings).

The power shaft 160, shown in further detail in FIGS. 4-6, includes a coupling portion 170, an eccentric portion 172, and a power transfer portion 174. The power transfer portion 174 is in the form of a planar trench which extends completely through the power shaft 160. An actuator bore 176 extends from a coupling portion 178 completely through the power transfer portion 174 along a power shaft axis of rotation 180.

The power transfer portion 174 generally defines a plane which includes the power shaft axis of rotation 180.

The coupling portion 170 is configured to be operably coupled with the motor 140 through the belt 152 (FIG. 1) such that the power shaft 160 can be rotated about the axis of rotation 180. Returning to FIG. 6, the coupling portion 170 has an origin 182 which is located on the axis of rotation 180 when the system 100 is assembled. The eccentric portion 172 has an origin 184 that is located directly below the origin 182 when the shaft 160 is in a "zero" position as depicted in FIG. 6. Accordingly, the outer periphery of the eccentric portion 172 is closer to the axis of rotation 180 at locations above a horizontal centerline 186 of the eccentric portion 172 than at corresponding locations below the horizontal centerline 186.

With reference to FIGS. 7-10, the crank 164 includes an eccentric portion 200. A bore 202 extends completely through the crank 164 and two grooves 204/206 extend outwardly from the bore 202 completely through the eccentric portion 200. The grooves 204/206 extend generally helically about a groove axis 208. The grooves 204/206 are "generally" helical in that the angular positions of the grooves 204/206 at locations closer to a first end portion 210 of the crank 164 change more quickly than at locations closer to a second end portion 212. The generally helical nature of the grooves 204/206 is explained with further reference to FIG. 9.

Figure 9:
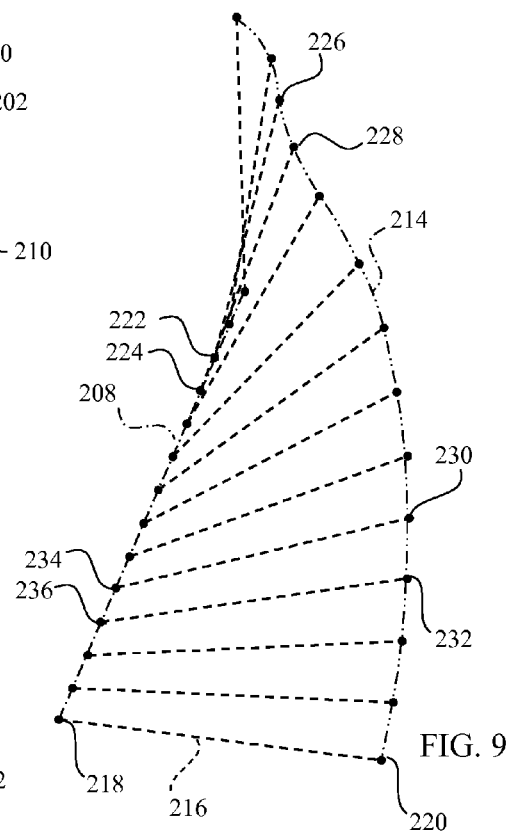
FIG. 9 depicts a schematic view of the groove axis of the crank of FIG. 3 along with a groove centerline exhibiting the generally helical nature of the grooves.

In FIG. 9, the line 214 represents the location of the center of one of the grooves 204/206 from a location close to the end portion 210 (the top of the line 214 as depicted in FIG. 9) to a location close to the end portion 212. Each location on the groove axis 208 is associated with a corresponding groove location that lies on a line orthogonal to the groove axis 208 at the intersection of the orthogonal line with the line 214. For example, a line 216 is orthogonal to the groove axis 208 at groove axis location 218 and intersects the groove centerline 214 at a groove location 220.

The grooves 204 and 206 are generally helical in that as the axial location along the groove axis 208 changes between the groove axis locations located close to the end portion 210 (e.g., groove axis locations 222 and 224), the angular difference (i.e., the rotation of an associated orthogonal line, e.g., line 216, about the axis 208) between the associated groove locations (e.g., groove locations 226 and 228) is much greater than the angular difference between the groove locations (e.g., groove axis locations 230 and 232) associated with groove axis locations (e.g., groove locations 234 and 236), even though the axial distance between the upper groove axis locations is the same as the axial distance between the lower groove axis locations.

Figure 8:
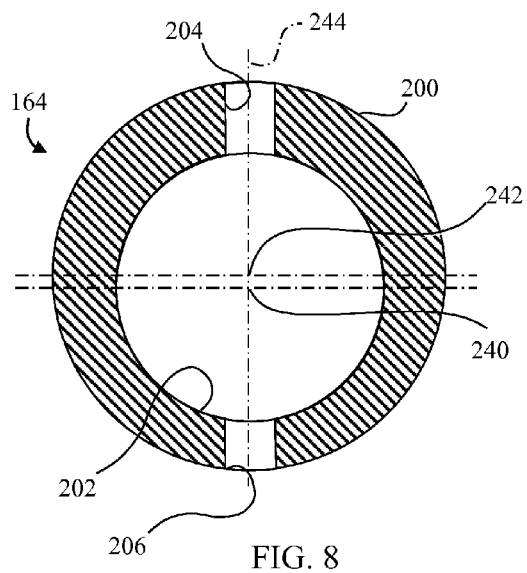
FIG. 8 depicts a cross-sectional view of the power shaft of FIG. 3 showing two grooves extending through the eccentric portion of the crank along with the origin of the eccentric portion with respect to the origin of the crank bore with the crank in a zero degree position.
Figure 10:
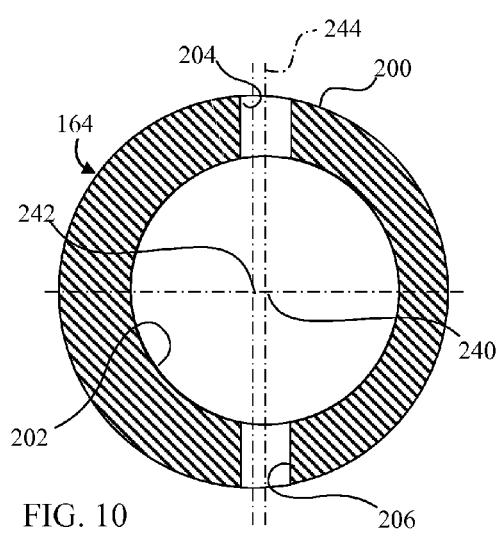
FIG. 10 depicts a cross-sectional view of the power shaft of FIG. 3 showing two grooves extending through the eccentric portion of the crank along with the origin of the eccentric portion with respect to the origin of the crank bore with the crank in a ninety degree position.

Returning to FIG. 8, the bore 202 has an origin 240 while the eccentric portion 200 has an origin 242 that is located directly above the origin 240 when the crank 164 is in a "zero" degree position with the grooves 204 and 206 aligned with a vertical centerline 244 of the bore 202 as depicted in FIG. 8. Accordingly, while the grooves 204 and 206 are mirror images of each other (i.e., spaced 180 degrees apart at each location along the groove axis 208), the groove 204 is deeper than the groove 206 in the view depicted in FIG. 8 since the groove 204 extends through the thickest portion of the eccentric portion 200. In this embodiment, FIG. 8 depicts the grooves 204 and 206 at the groove axis location closest to the end portion 210. FIG. 10 depicts the grooves 204 and 206 at the groove axis location closest to the end portion 212, also referred to herein as the "90 degree" location with the grooves 204 and 206 aligned with the vertical centerline 244. In FIG. 10, the grooves 204 and 206 have about the same depth.

Figure 11:
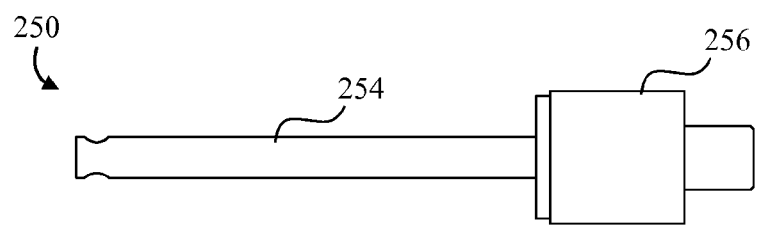
FIG. 11 depicts a side plan view of the actuator rod assembly of FIG. 3.
Figure 12:
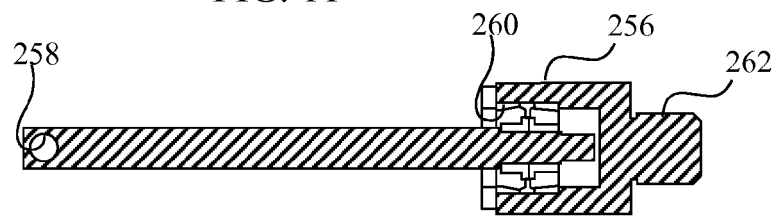
FIG. 12 depicts a side cross-sectional view of the actuator rod assembly of FIG. 3.

With reference to FIG. 3, the actuator assembly 162 includes an actuator rod assembly 250 fixedly mounted to a ball and screw assembly 252. The actuator rod assembly 250, also shown in FIGS. 11 and 12, includes an actuator rod 254 and an actuator rod holder 256. The actuator rod 254 includes a bore 258 at one end while the opposite end is configured to be rotatably received within a coupling portion 260 of the actuator rod holder 256. The coupling portion 260 is configured to allow the actuator rod 254 to rotate freely therein while maintaining a fixed axial relationship between the actuator rod holder 256 and the actuator rod 254.

The actuator rod holder 256 further includes a coupling portion 262 which is press fit within a coupling portion 264 of the ball and screw assembly 252 (see FIG. 3). The ball and screw assembly 252 may include a ball and screw Model No. R-44 commercially available from Rockford Ball Screw Company of Rockford Ill.

Figure 13:
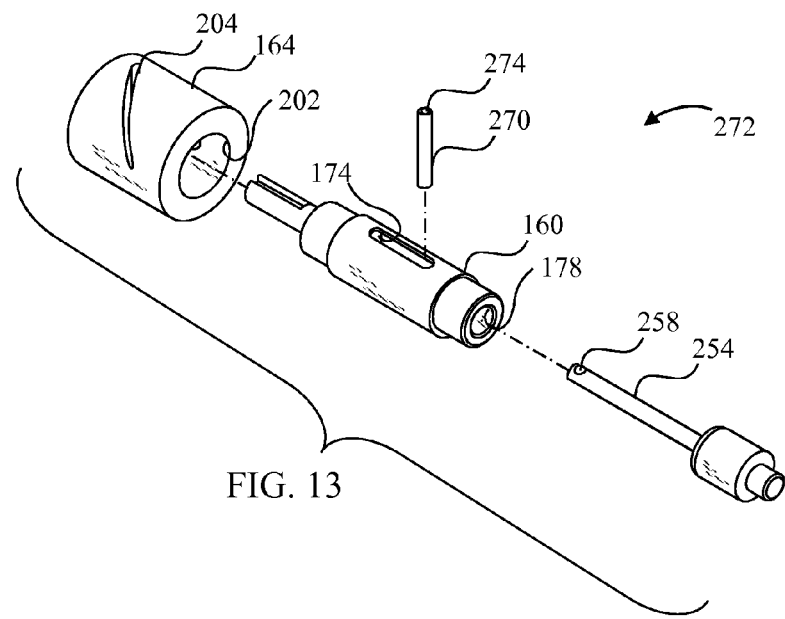
FIG. 13 depicts an exploded perspective view of the eccentric subassembly of FIG. 3.

Assembly of the cam assembly 144 is described with initial reference to FIG. 13. The cam assembly 144 is assembled by insertion of the actuator rod 254 within the actuator bore 176 (see FIG. 5) of the power shaft 160 through the coupling portion 178. The actuator rod 254 and power shaft 160 are then inserted into the bore 202 of the crank 164 and the grooves 204/206, the power transfer portion 174, and the bore 258 are aligned. A power transfer rod 270 is then inserted into the aligned grooves 204/206, power transfer portion 174, and bore 258 to form an eccentric subassembly 272. The power transfer rod 270 is sized to provide a close fit with each of the grooves 204/206, power transfer portion 174, and bore 258. In this embodiment, the power transfer rod 270 includes a bore 274 extending lengthwise through the entire length of the power transfer rod 270.

Figure 14:
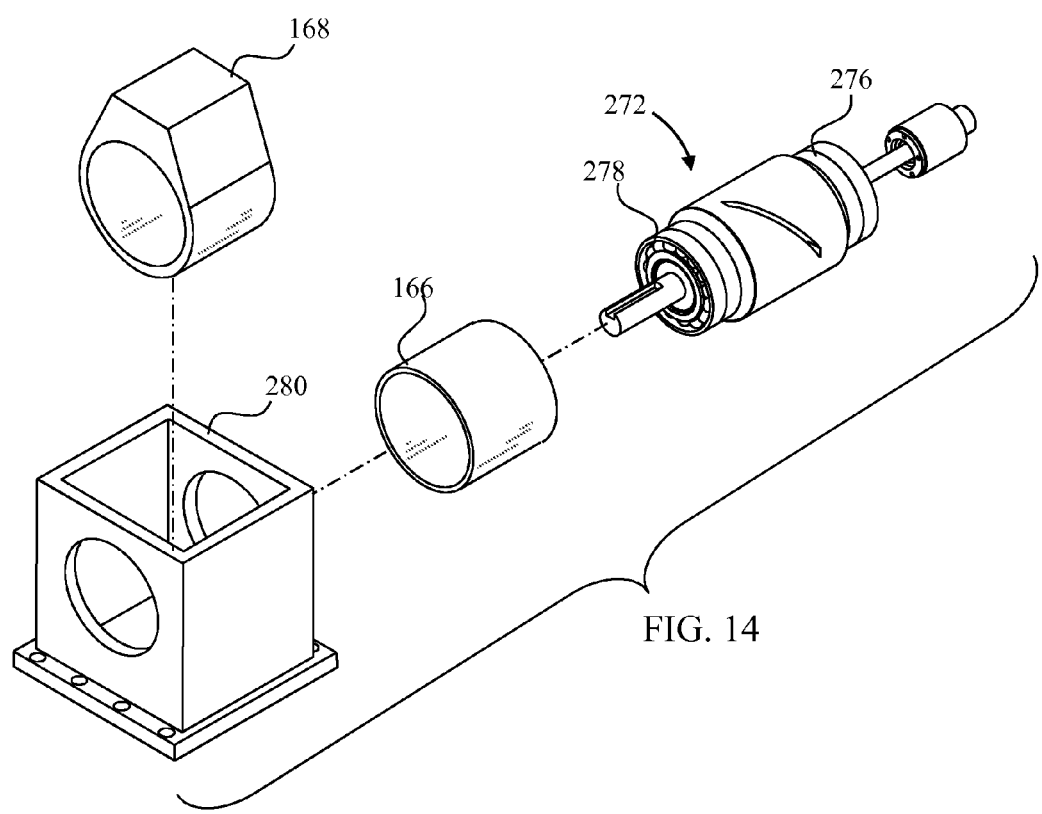
FIG. 14 depicts an exploded perspective view of the cam assembly of FIG. 3.

The eccentric subassembly 272 (shown in FIG. 14 with bearing assemblies 276 and 278) is then positioned within the retaining sleeve 166. The retaining sleeve 166 is sized to fit tightly over the eccentric portion 200 of the crank 164 so as to retain the power transfer rod 270 within the grooves 204/206, power transfer portion 174, and bore 258. The combined eccentric subassembly 272 and retaining sleeve 166 are then inserted within the cam follower 168 which is positioned in a cam assembly casing 280. Once within the cam assembly casing 280, the axial location of the power shaft 160, the crank 164, the retaining sleeve 166, and the cam follower 168 along the axis of rotation 180 is fixedly established by bearing assemblies 276 and 278.

Figure 15:
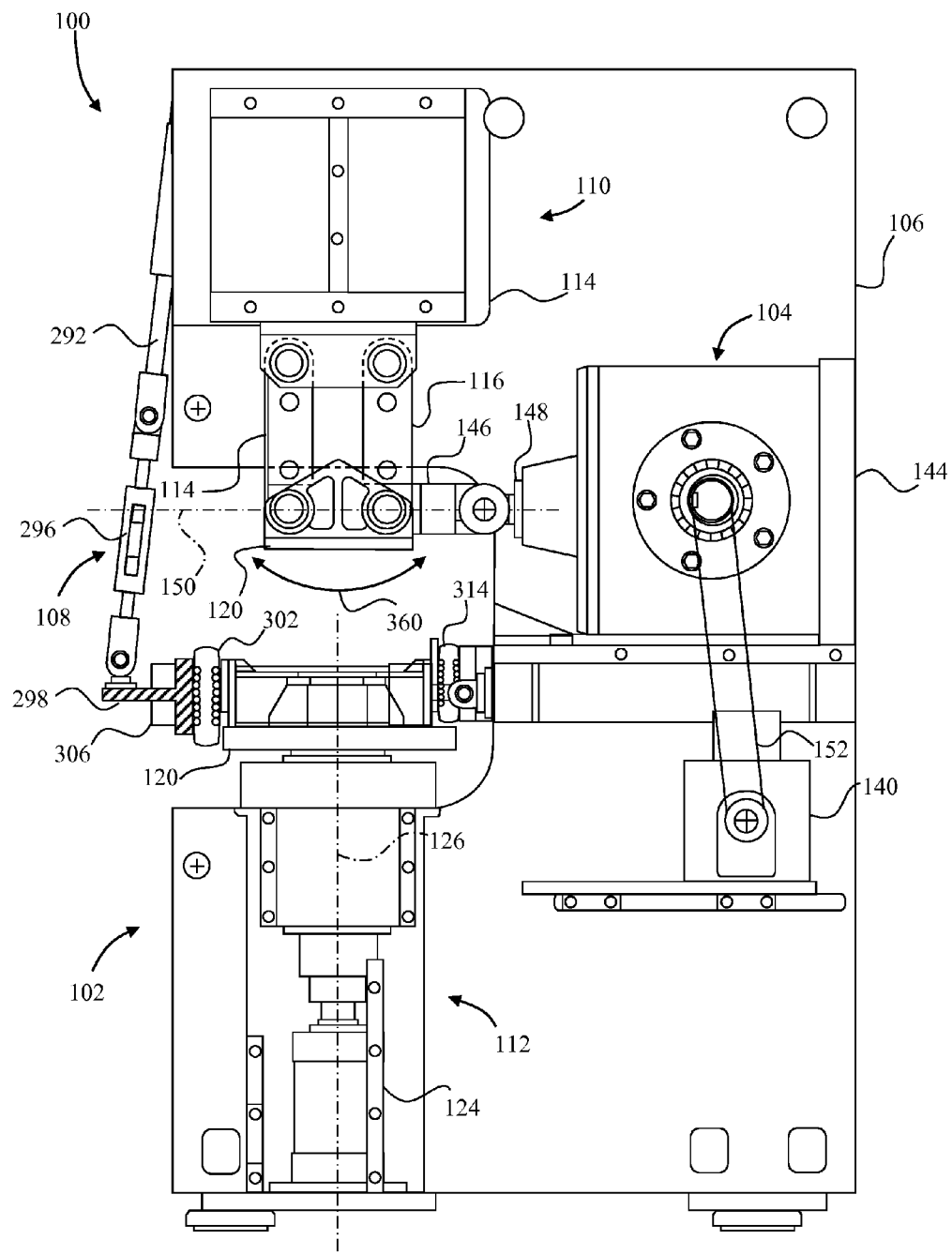
FIG. 15 depicts a partial side cutaway plan view of the linear friction welding system of FIG. 1.
Figure 16:
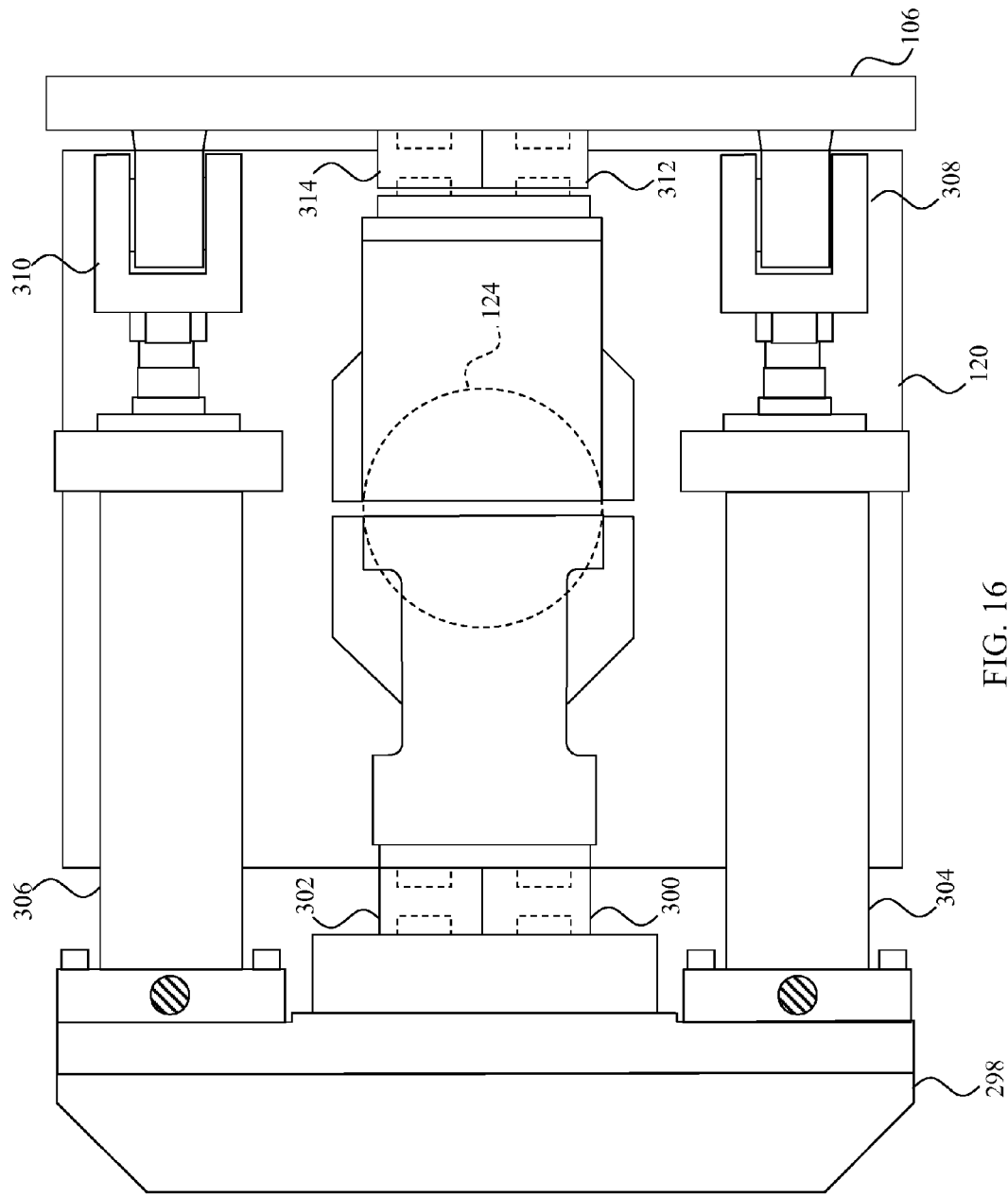
FIG. 16 depicts a top plan view of the base, linear bearings, and hydraulic cylinders of the stiffening assembly of FIG. 1.

With reference to FIGS. 1, 15, and 16, the stiffening assembly 108 includes two stiffening arms 290 and 292 which are pivotably connected to the frame 106. Each of the stiffening arms 290/292 includes a respective turnbuckle assembly 294/296 which can be used to adjust the length of the stiffening arms 290/292. The stiffening arms 290/292 pivotably support a base 298.

The base 298 supports two linear bearings 300/302. The base 298 is further connected to two hydraulic presses or cylinders 304/306. The hydraulic cylinders 304/306 may be model 4HHFHF14K hydraulic cylinders available from The Sheffer Corporation of Cincinnati Ohio. The hydraulic cylinders 304/306 are pivotably mounted to the frame 106 through respective pivot assemblies 308/310. The stiffening assembly 108 further includes two linear bearings 312 and 314 which are mounted to the frame 106 at a location between the hydraulic cylinders 304/306. The linear bearings 300/302/304/306 may be, for example, TYCHOWAY model R987144745 linear bearings available from Bosch Rexroth Corporation of Hoffman Estates, Ill.

Figure 17:
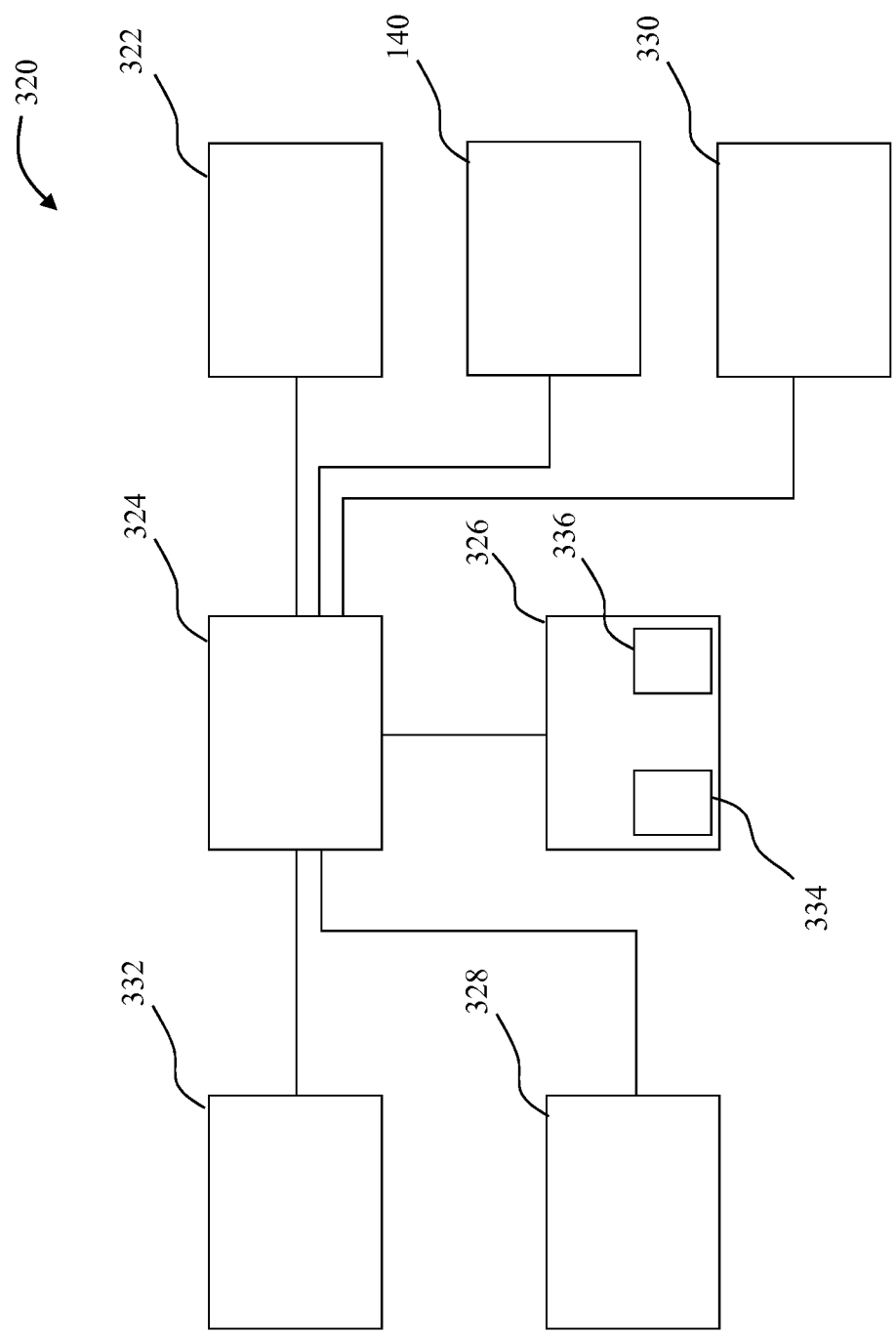
FIG. 17 depicts a control system that can be used to operate the system of FIG. 1.

The linear friction welding system 100 is operated under the control of a welding control system 320 depicted in FIG. 17. The control system 320 includes an I/O device 322, a processing circuit 324 and a memory 326. The control system 320 is operably connected to a hydraulic pump 328, the motor 140, an actuator motor 330, and a sensor suite 332. If desired, one or more of the components of the system 320 may be provided as a separate device which may be remotely located from the other components of the system 320.

The I/O device 322 may include a user interface, graphical user interface, keyboards, pointing devices, remote and/or local communication links, displays, and other devices that allow externally generated information to be provided to the control system 320, and that allow internal information of the control system 320 to be communicated externally.

The processing circuit 324 may suitably be a general purpose computer processing circuit such as a microprocessor and its associated circuitry. The processing circuit 324 is operable to carry out the operations attributed to it herein.

Within the memory 326 are various program instructions 334. The program instructions 334, some of which are described more fully below, are executable by the processing circuit 324 and/or any other components of the control system 320 as appropriate. Parameter databases 336 are also located within the memory 326.

Figure 18:
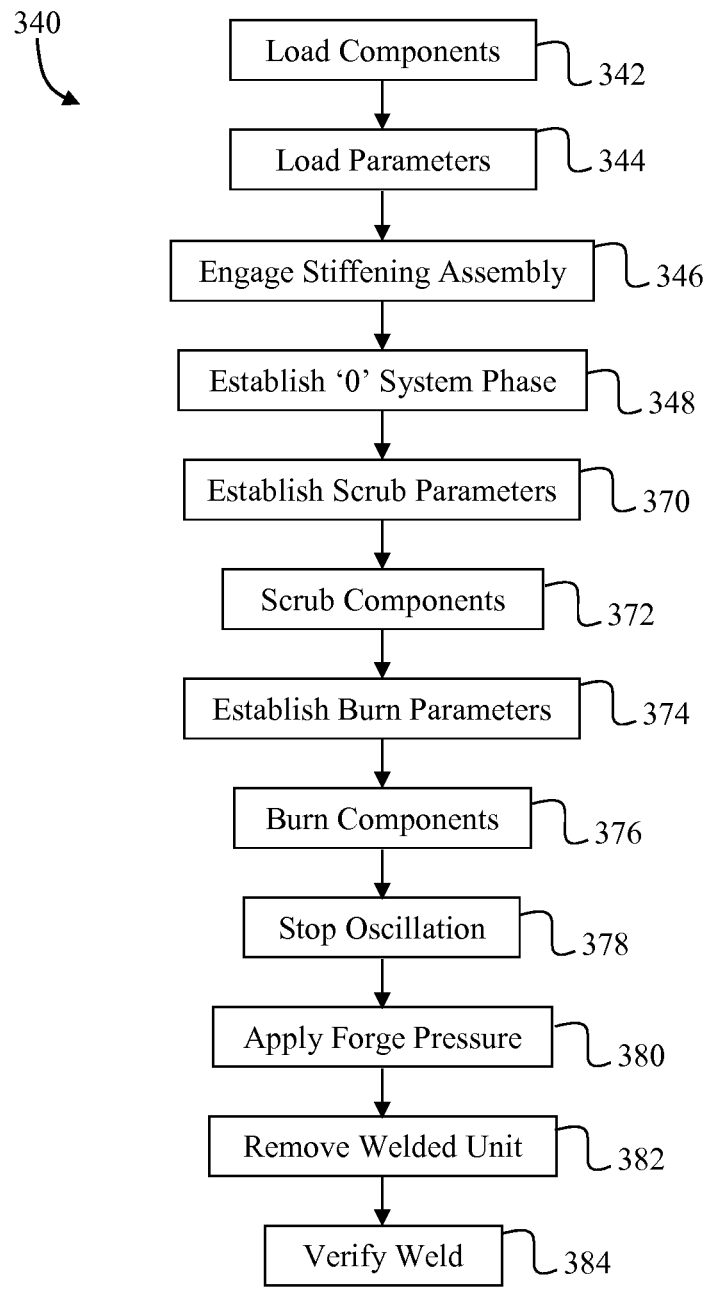
FIG. 18 depicts a procedure that can be executed under the control of the control system of FIG. 17 to form a welded unit with the linear friction welding system of FIG. 1.

Further details regarding the control system 320 and the linear friction welding system 100 are provided with reference to the procedure 340 of FIG. 18. The processing circuit 324 executes the program instructions 334 to execute at least some of the procedure 340 of FIG. 18. In different embodiments, the procedure 340 may be modified to include more or fewer steps depending upon the specific criterion.

At block 342 of FIG. 18, the components which are to be welded are loaded into the linear friction welding system 100. One of the components is fixedly positioned on the forge platen 122 while the other component is fixedly attached to the carriage 120. The control parameters are loaded into the parameter databases 336 at block 344. Parameters which may be loaded include scrub parameters, burn parameters, and forging parameters, each of which is further described below.

At block 346, the stiffening assembly 108 is engaged with the component positioned on the forge platen 122 and at block 348 the system phase angle of the linear friction welding system 100 is established at a "0" system phase angle. A system phase angle of zero may be established using stored position information of the power shaft 160 and the axial location of the actuator rod 254. The system phase angle is then verified by rotating the power shaft 160 at a low speed. Once the power shaft 160 is rotating, the processing circuit 324, using one or more sensors from the sensor suite 332, monitors the ram 146 for movement. In one embodiment, the sensor suite 332 includes an LVDT positioned to monitor movement of the ram 146. When the system phase angle is zero, the ram 146 is motionless as explained with initial reference to FIG. 19.

Figure 19:
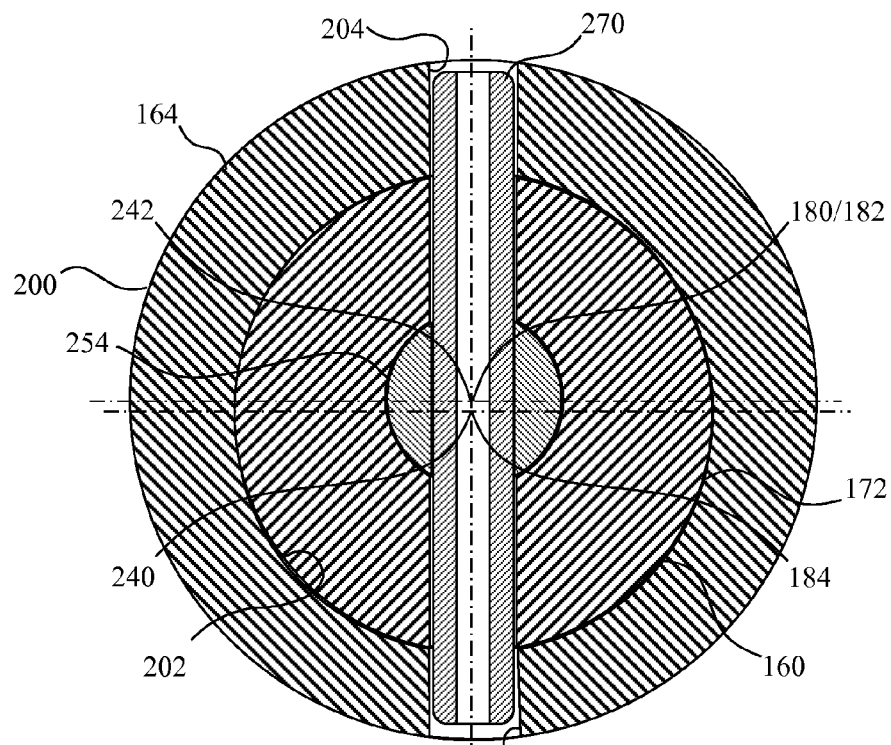
FIG. 19 depicts a cross-sectional view of the power transfer rod, crank, and power shaft of FIG. 3 when the power transfer rod is controlled to an axial position resulting in a zero degree system phase angle.

FIG. 19 depicts the power shaft 160 at its zero position with the origin 184 of the eccentric portion 172 located directly beneath the origin 182 of the coupling portion 170 (not shown in FIG. 19), with the origin 182 coincident with the axis of rotation 180 of the power shaft 160. FIG. 19 further depicts the crank 164 at its zero position with the origin 242 of the eccentric portion 200 located directly above the origin 240 of the bore 202. The offset between the origin 182 and the origin 184 is selected to be the same as the offset between the origin 240 and the origin 242. Accordingly, when the crank 164 and the power shaft 160 are in the arrangement of FIG. 19, the eccentricity of the power shaft 160 is exactly offset by the eccentricity of the crank 164.

Consequently, the origin 242 of the outer perimeter of the eccentric portion 200 is coincident with the axis of rotation 180. Thus, the outer surface of the eccentric portion 200 is exactly centered on the axis of rotation 180. Accordingly, as the eccentric portion 200 rotates about the axis of rotation 180, every portion of the outer periphery of the eccentric portion 200 is located equidistant from the axis of rotation 180. Therefore, the eccentric portion 200 simply spins within the cam follower 168 and the ram 146 does not move.

Figure 20:
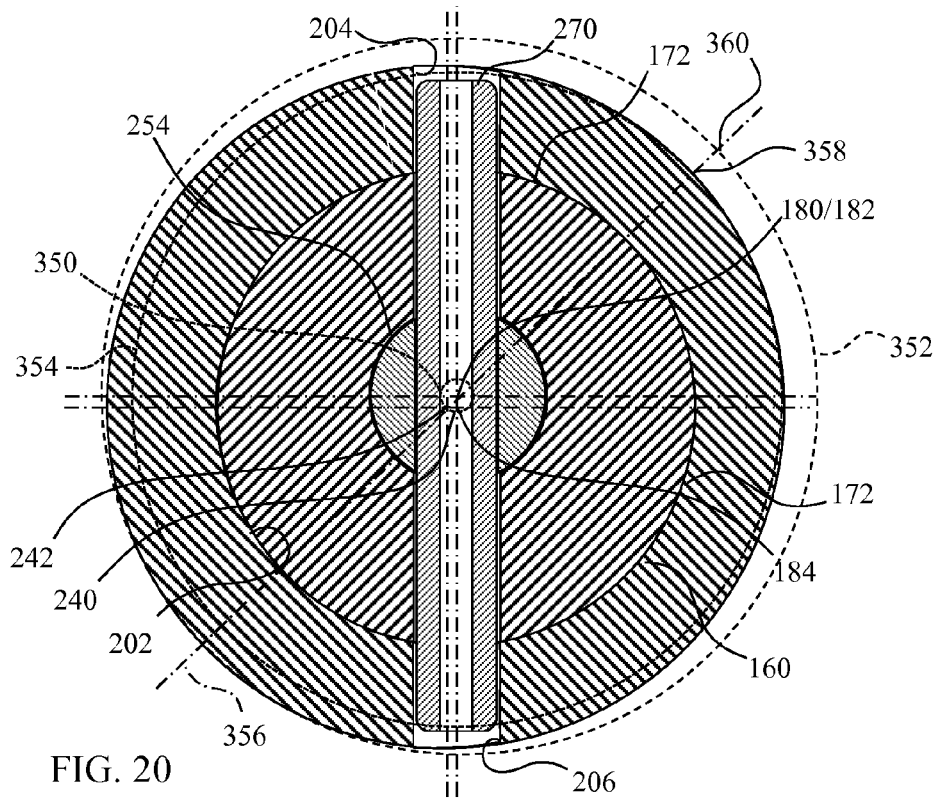
FIG. 20 depicts a cross-sectional view of the power transfer rod, crank, and power shaft of FIG. 3 when the power transfer rod is controlled to an axial position resulting in a ninety degree system phase angle along with the range of movement of the eccentric portion of the crank which results.

If there is any movement of the ram 146, then the origin 242 of the eccentric portion 200, the origin 184 of the eccentric portion 172, and the origin 182 of the coupling portion 170 are not aligned as in FIG. 19. By way of example, FIG. 20 depicts the power shaft 160 at its zero position with the origin 184 of the eccentric portion 172 located directly beneath the origin 182 of the coupling portion 170 as in FIG. 19. The eccentric portion 200, however, has been rotated 90 degrees from the zero degree position (also shown in FIG. 8) to the ninety degree position (also shown in FIG. 10). Accordingly, while the origin 240 of the bore 202 is still aligned with the origin 184 of the eccentric portion 172, the origin 242 of the eccentric portion 200 has been rotated in a counterclockwise direction by ninety degrees with respect to the orientation of FIG. 19. This configuration is referred to herein as a "ninety degree system phase angle". The offset between the origin 242 and the axis of rotation 180 results in movement of the ram 146.

Specifically, as the power shaft 160 is rotated by the motor 140, rotational force is transferred from the power transfer portion 174 of the shaft 160 to the power transfer rod 270. Rotational force is further transferred from the power transfer rod 270 to the crank 164 by contact of the power transfer rod 270 with both the sidewall of the groove 204 and the side wall of the groove 206. Accordingly, the origin 242 of the eccentric portion 200 is forced to rotate about the axis of rotation 180 along a circle 350 (see FIG. 20). The periphery of the eccentric portion 200 thus sweeps an outermost area bounded by the circle 352 of FIG. 20. For a given location of the eccentric portion 200, the point of the eccentric portion 200 directly opposite to the point of the eccentric portion 200 farthest from the axis of rotation 180 lies on a circle 354 which defines the innermost location of the outer periphery of the eccentric portion 200. For any axis passing through the axis of rotation and both the innermost circle 354 and the outermost circle 352 such as the axis 356, the difference between the intersection 358 with the innermost circle 354 and the intersection 360 with the outermost circle 352 is the vibration amplitude of the system 100. This difference is at a maximum when the cam assembly 144 is at a 90 degree system phase angle in this embodiment.

Modification of the system phase angle from a non-zero degree phase angle to the zero degree system phase angle of FIG. 19 is accomplished by using the actuator rod 254 to force the power transfer rod 270 to move axially within the grooves 204 and 206. Specifically, both the crank 164 and the power shaft 160 are constrained from axial movement. Accordingly, axial movement of the actuator rod 254 forces the power transfer rod 270 to move axially within the power transfer portion 174. Because the power transfer portion 174 extends axially along the axis of rotation 180, axial movement of the power transfer rod 270 within the power transfer portion 174 is not impeded.

Axial movement of the power transfer rod 270 is somewhat impeded, however, by the generally helical grooves 204 and 206. Specifically, the grooves 204/206 are not aligned with the axis 180. Rather, the grooves 204/206 extend generally helically about the groove axis 208 which is aligned with the axis of rotation 180. Accordingly, axial movement of the power transfer rod 270 forces the power transfer rod 270 against the sidewalls of the grooves 204/206. Because the crank 164 is axially constrained, the force applied to the sidewalls of the grooves 204/206 because of the axial movement of the actuator rod 254 causes the crank 164 to rotate on the eccentric portion 172 of the power shaft 160.

The axial position of the actuator rod 254 thus controls the orientation of the crank 164 with respect to the power shaft 160. Accordingly, the phase between the eccentric portion 172 of the shaft 160 and the eccentric portion 200 of the crank 164 can be controlled by axially positioning the actuator rod 254. The location of the actuator rod 254 is controlled by the processing circuit 324 which controls the actuator motor 330 which is connected to the ball and screw assembly 252 (see FIG. 3). Sensors within the sensor suite 332 may be used to provide axial position data of the actuator rod 254 when controlling the motor 330.

Returning to the procedure 340 of FIG. 18, once a zero system phase angle has been established at block 348, scrub parameters are established at block 370. Scrub parameters are established under the control of the processing circuit 324 which controls the main hydraulic press 124 to raise the weld component mounted on the forge platen 122 into contact with the weld component mounted on the carriage 120. By monitoring the pressure of the hydraulic press 124, and/or using other sensory inputs, the processing circuit 324 determines when the two weld components are brought into contact. If the contact happens at a travel location of the forge platen 122 that is not expected, a user warning may be issued.

Once the components to be welded are in contact, the initial positions of the two weld components are stored, such as by storing the output of the sensor 132, and the processing circuit 324 controls the main hydraulic press 124 to achieve a desired scrub pressure based upon a value stored in the parameters database 336. The processing circuit 324 further obtains a scrub frequency from the parameters database 336 and controls the speed of the motor 140 to a speed corresponding to the desired scrub frequency. In embodiments wherein frequency is modified before modification of the system phase angle, the motor 140 at this point in the procedure will be rotating at a speed associated with the scrub frequency while the ram 146 remains motionless. The processing circuit 324 then controls motor 330 to axially position the actuator rod 254 at a location associated with a system phase angle that provides the desired scrub amplitude of the ram 146 in accordance with a scrub amplitude parameter stored in the parameter database 336.

As discussed above with respect to FIGS. 19-20, modification of the system phase results in displacement of the origin 242 of the eccentric portion 200 resulting in oscillation of the eccentric portion 200. This oscillation is transferred to the cam follower 168 (see FIG. 3). Accordingly, the cam follower 168 is forced to rotate. The end of the connecting rod 148 which is coupled to the cam follower 168 is thus forced to follow the movement of the cam follower 168. The coupler rod 148 translates the movement of the coupler receiving end to a linear vibratory movement along the weld axis 150 at the end of the connecting rod 148 coupled with the ram 146.

Once the scrub pressure, scrub frequency, and scrub amplitude have been established, a scrub timer is started and counted down using a system clock or other appropriate clock. As the scrub is performed, a "wiping action" is generated by the linear friction welding system 100. The wiping action is a result of the incorporation in the linear friction welding system 100 of the rocker arm pairs 116 and 118. As the ram 146 vibrates along the weld axis 150, the carriage 120 "swings" on the rocker arm pairs 116 and 118 as indicated by the arrow 360 of FIG. 1. The vertical position of the carriage 120 thus varies as a function of the length of the rocker arm pairs 116 and 118 and the amplitude of the scrub vibration.

The cyclical variation in the height of the carriage 120 generates a cyclical variation in the pressure between the welding components. For example, when the ram 146 is at the middle location of the stroke, the carriage 120 is at its lowest vertical position. As the ram 146 oscillates, the carriage 120 swings along the arc defined by the rocker arm pairs 116 and 118. Accordingly, the carriage 120 moves upwardly from the lowest vertical position, thereby relieving some of the pressure between the weld components as the ram 146 moves forwardly or backwardly from the mid-stroke position. Of course, this pressure variation could be removed by increasing the reaction speed of the main hydraulic press and/or increasing the sensitivity of the pressure control associated with positioning of the main hydraulic press 122. Maintaining some amount of wiping action, however, is desired in order to increase the efficiency of the system.

Specifically, as two weld components are scrubbed, relative linear movement of the weld components is used to generate heat in the weld components because of friction between the weld components. As the temperature of the weld components increases, one or both of the components begins to plasticize at the weld interface. The plasticized material acts like a liquid, allowing the opposing surface to hydroplane on the plasticized surface. The reduced friction which results when the two surfaces are hydroplaning reduces the conversion of linear movement into heat.

Accordingly, for a given amount of linear movement, the resulting heat energy transferred to the two weld components is reduced when hydroplaning is occurring. The cyclical variation in pressure resulting from the wiping action of the linear friction welding system 100, however, disrupts the plasticized layer between the weld components, reducing the hydroplaning effect and increasing the conversion of linear movement into heat. Depending upon the particular dimensions of the linear friction welding system 100 and the materials being welded, 10-25 percent less energy may be used to perform a particular scrub when wiping action as described herein is provided. Moreover, the uniformity of the energy transfer is increased along the weld component interface, resulting in a more consistent weld.

As will be recognized by those of skill in the art, the movement of the ram 146 is not purely along the axis 150. Specifically, at the connection with the connecting rod 148, the ram 146 moves substantially completely along the axis 150 while the end of the ram 146 that is rigidly connected to the carriage 120 is deflected away from and toward the axis 150 because of the rocker arm pairs 116 and 118 which force the carriage 120 to oscillate. Similarly, while the carriage 120 is described herein as oscillating because of the rocker arm pairs 116 and 118, the amount of cross-axis movement may be significantly reduced by lengthening the rocker arm pairs 116 and 118 resulting in substantially pure axial movement.

When the desired scrub has been performed at block 372, burn parameters are established in the linear friction welding system 100 at block 374. Specifically, the processing circuit 324 controls the main hydraulic press 124 to achieve a desired burn pressure based upon a value stored in the parameters database 336. The processing circuit 324 further obtains a burn frequency from the parameters database 336 and controls the motor 140 to a speed corresponding to the desired burn frequency. The processing circuit 324 then controls the motor 330 to an axial location corresponding to the desired burn amplitude based upon burn amplitude data stored in the parameters database 336. In one embodiment, all of the changes from the scrub parameters to the burn parameters are controlled to occur substantially simultaneously.

Once the burn pressure, burn frequency, and burn amplitude have been established, a burn timer is started and counted down using a system clock or other appropriate clock, and a burn is performed at block 376. During the burn, the processing circuit 324 obtains input from the sensor suite 332 and modifies the speed of the motor 140 as needed to maintain the desired burn frequency, modifies the axial location of the actuator rod 254 to maintain the desired amplitude, and controls the main hydraulic press 124 to maintain the desired burn pressure.

When the burn timer has expired, movement of the ram 146 is terminated at block 378. Movement can be terminated under the control of the processing circuit 324 by adjusting the axial location of the actuator rod 254 using the motor 330 to obtain a system phase angle of zero. Then, while the motor 140 rotates with no movement of the ram 146, the processing circuit 324 controls the main hydraulic press 124 to establish a forge pressure at block 380 between the two weld components based upon data stored in the parameters database 336. The forge pressure applied to properly burned components which are not moving with respect to one another welds the two components together into a welded unit.

Once the components have been welded, the welded unit can be removed (block 382) and the weld verified (block 384). If desired, the processing circuit 324 may be used to determine the weld quality. Specifically, at block 370, the initial position of the forge platen 122 as the two weld components came into contact was stored. At the completion of the welding of the two components into a welded unit, the processing circuit 324 may obtain position data from the sensor 132 indicative of the position of the forge platen 122 after a weld has been formed. The difference between the two locations indicates a loss of material from the two components at the contact point of the two components.

Additionally, the temperature of the two components can be established, either by sensory input from the sensor suite 332 and/or by historic knowledge of the effects of the scrub and burn processes on the materials of the two components. Furthermore, the actual pressure, frequency, and amplitude of the procedure 340 provide precise information about the amount of energy placed into the components during the procedure 340. Consequently, the foregoing data may be used to calculate the amount of material lost due to flash and the nature of the weld formed.

The linear welding system 100 thus provides precise and independent control of pressure applied as well as the frequency and amplitude of oscillation during the procedure 340. Accordingly, in addition to modifying the pressure between two components during scrubbing, burning, and forging of two components, the frequency and amplitude of oscillation may also be independently modified between the scrubbing and burning procedures.

Figure 21:
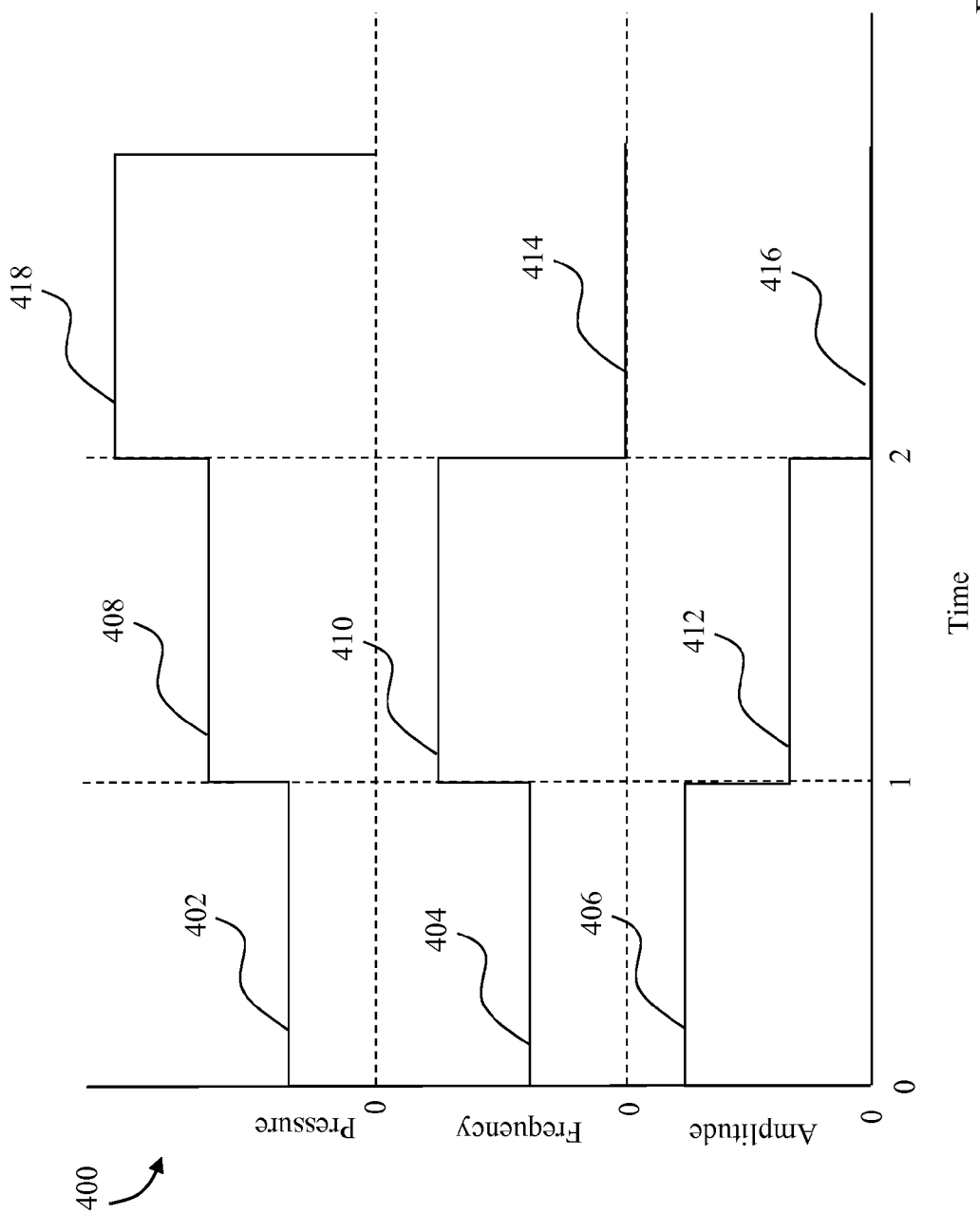
FIG. 21 depicts the parameters for pressure, frequency and amplitude of the linear friction welding system of FIG. 1 for an exemplary scrub, burn, and forge cycle in accordance with the procedure of FIG. 18.

By way of example, FIG. 21 depicts a chart 400 depicting scrubbing, burning, and forging parameters during an exemplary welding process. At T=0, scrub pressure 402, scrub frequency 404, and scrub amplitude 406 are established. For titanium components, the scrub pressure 402 may be about 5,000 pounds per square inch ("psi"), the scrub frequency may be about 20 hertz ("Hz"), and the scrub amplitude 406 may be about 6 millimeters ("mm"). At T=1, which in this example may be after about 2 seconds, the scrub pressure 402 is changed to a burn pressure 408 of about 7,500 psi, the scrub frequency 404 is changed to a burn frequency 410 of about 40 Hz, and the scrub amplitude 406 is changed to a burn amplitude 412 about 4 mm. When the desired conditions have been established at the interface between the two components, then at T=2 the frequency 414 and amplitude of oscillation 416 is established at zero while a forge pressure 418 of about 15,000 psi is established. The two components then form a weld under the forge pressure 418.

Moreover, in addition to the ability to independently control pressure and oscillation frequency and amplitude, the linear friction welding system 100 provides the ability to rapidly and precisely vary the various parameters. In one embodiment wherein the motor 140 is a servo motor nominally rated at 75 horsepower and 6,000 RPM with 2.0 service factor, the movement of the ram 146 following a burning process can be completely stopped within 0.25 seconds and more preferably within 0.1 sec.

In one embodiment, the actuator motor 330 is a model SGMGV-13D3A61 Sigma-5 servo motor manufactured by Yaskawa America, Inc. of Waukegan, Ill., coupled with a model SGDV-5R4D11A controller also manufactured by Yaskawa America, Inc. of Waukegan, Ill., both of which are commercially available from Applied Machine & Motion Control, Inc. of Cincinnati, Ohio.

Precision of amplitude control throughout the available range of amplitude is enhanced by the incorporation of the generally helical grooves 204/206. Specifically, incorporation of the generally helical grooves 204/206 results, in the present embodiment, in a linear relationship between axial position of the actuator rod 254 and the system phase angle. The relationship between axial position of the actuator rod 254 and system phase angle is maintained in accordance with the parameters set forth in Table 1 below:

| Stroke Amplitude (mm) | Stroke Amplitude (in) | System Phase φ (rad) | System Phase φ (deg) | Actuator Travel (in) | Revolutions |
|---|---|---|---|---|---|
| 0.0 | 0.0 | 0.0 | 0.0 | 0.0 | 0.0 |
| 0.799592 | 0.03148 | 0.20033 | 5.739 | 0.300 | 0.015942 |
| 1.599184 | 0.06296 | 0.40272 | 11.537 | 0.600 | 0.032047 |
| 2.398776 | 0.09444 | 0.60939 | 17.458 | 0.900 | 0.048493 |
| 3.198368 | 0.12592 | 0.82303 | 23.578 | 1.200 | 0.065495 |
| 3.99796 | 0.1574 | 1.04720 | 30.000 | 1.500 | 0.083333 |
| 4.797552 | 0.18888 | 1.28700 | 36.870 | 1.800 | 0.102416 |
| 5.597144 | 0.22036 | 1.55079 | 44.427 | 2.100 | 0.123408 |
| 6.396736 | 0.25184 | 1.85459 | 53.130 | 2.400 | 0.147584 |
| 7.196328 | 0.28332 | 2.23954 | 64.158 | 2.700 | 0.178217 |
| 7.596124 | 0.29906 | 2.50647 | 71.805 | 2.850 | 0.199459 |
| 7.796022 | 0.30693 | 2.69344 | 77.161 | 2.925 | 0.214337 |
| 7.895971 | 0.310865 | 2.82503 | 80.931 | 2.963 | 0.224809 |
| 7.99592 | 0.3148 | 3.14156 | 89.999 | 3.000 | 0.249998 |

Table 1 shows the amplitude (in millimeters and inches) of vibration of the ram 146 that is achieved for different travel distances (Actuator Travel) of the actuator rod 254. Table 1 further shows the system phase angle related to the axial location of the actuator rod 254 in both degrees and radians, as well as the movement of the shaft of the actuator motor 330 (in revolutions) that is needed to move the actuator rod 254 to the associated axial location. The precise orientation of the shaft of the actuator motor 330 is provided by incorporation of 24 Bit encoders which generate 16,777,215 encoder counts per revolution when controlling the actuator motor 330.

The encoder on the actuator motor 330 and another encoder on the motor 140 are controlled by a model number DMC-4010-C012-I000 1-axis Ethernet/RS232 controller commercially available from Galil Motion Control, Inc. of Rocklin, Calif. The output of the encoder on the shaft of the motor 140 and the encoder on the actuator motor 330, which may be included within the sensor suite 332, are provided to the processing circuit 324 which uses the sensed position of the shaft of the motor 140 and the shaft of the actuator motor 330 as part of a control loop to finely control servo drivers which control the rotation of the motor 140 and of the actuator motor 330. The control loop may be executed by the processing circuit 324 up to 1,000 times per second or faster. Accordingly, vibration of the ram 146 can be modified within 1/1,000 of a second of the determination that ram oscillation is to be modified.

The ability to rapidly stop all relative movement of the weld components provides for better welds and contributes to the increased efficiency of the linear friction welding system 100 discussed above. Moreover, the weld components can be placed under forge pressure without any axial loads (i.e., loads orthogonal to the forge axis) on the components or the associated tooling. In contrast, prior art systems terminate oscillation by application of a large axial force on the weld components resulting in the forge pressure being applied in the presence of a large axial load. The absence of an axial load on the weld components increases the quality of the final weld.

Rapid termination of movement of the ram 146 is also enhanced because the motor 140 and the associated power shaft 160, actuator 162, and crank 164 continue to rotate at a high rate. Accordingly, the stopping of movement of the ram 146 is not dependent upon countering inertia of the motor 140 and the associated power shaft 160, actuator 162, and crank 164. In addition to increased stopping speed, this results in reduced shock to the motor 140.

Moreover, the stiffening assembly 108 may be used to reduce undesired movement of the weld component positioned on the forge platen 122, thereby increasing efficiency of the welding system 100 as well as providing increased weld quality. The stiffening assemblies are adjusted once a weld component is positioned on the platen 122 by adjusting the length of the stiffening arms 282/294 using the turnbuckle assemblies 296/298. The stiffening arms 282/294 are adjusted so that the linear bearings 300/302 are substantially aligned with the linear bearings 312/314 with the weld component positioned therebetween. In some instances, temporary fixtures may be attached to the weld component with one or more of the linear bearings 300/302/312/314 abutting the temporary fixture.

Once the weld component and stiffening arms 292/294 are positioned, the processing circuit 324 may be used to control flow of hydraulic fluid to the hydraulic cylinders 306/308. If desired, the same hydraulic system used for the main hydraulic press may be used. The hydraulic cylinders 306/308 then pull the linear bearings 300/302 toward the linear bearings 312/314 against the weld component positioned on the platen 122. By clamping the weld component in this manner, movement of the weld component because of movement of the ram 146 is substantially reduced. Moreover, because the weld component is clamped between opposed linear bearings, the ability to finely control the pressure applied to the two weld component in the welding system 100 with the main hydraulic press is not unacceptably hindered.

The ability to modify the amplitude of the ram 146 and frequency of the motor 140 enables the linear friction welding system 100 to be used to form welds using different types of materials without requiring retooling of or physical modifications of the linear friction welding system 100. The precise control further enables unique capabilities including modified starting and stopping locations and varied scrub profiles. If desired, various modifications to the linear friction welding system 100 may be made to optimize the system 100 for particular welding operations.

While the present invention has been illustrated by the description of exemplary processes and system components, and while the various processes and components have been described in considerable detail, the applicant does not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

The invention claimed is:

1. A linear friction welding system comprising:
a power shaft defining a power shaft axis and including a first eccentric portion and a first power transfer portion;
a power transfer rod engaged with the first power transfer portion;
an actuator assembly operably coupled with the power transfer rod and configured to move the power transfer rod axially along the power shaft axis;
a crank including a second eccentric portion operably coupled with the first eccentric portion, and a second power transfer portion engaged with the power transfer rod, the linear friction welding system configured such that axial movement of the power transfer rod causes rotational movement of the crank with respect to the power shaft about the power shaft axis;
a cam follower operably connected to an outer surface of the second eccentric portion; and
a ram operably connected to the cam follower and configured to vibrate along a welding axis.

2. The linear friction welding system of claim 1, wherein:
the second power transfer portion includes a first groove which extends generally helically about a groove axis; and
the groove axis is parallel to the power shaft axis.

3. The linear friction welding system of claim 2, wherein the first power transfer portion comprises a linear groove extending along the power shaft axis.

4. The linear friction welding system of claim 3 wherein:
the second power transfer portion includes a second groove which extends generally helically about the groove axis; and
the power transfer rod is engaged with the first groove and the second groove.

5. The linear friction welding system of claim 3, wherein:
the first groove and the second groove are configured so as to provide a linear relationship between axial movement of the power transfer rod along the power shaft axis and ram vibration amplitude along the welding axis.

6. The linear friction welding system of claim 1, wherein the actuator assembly comprises:
an actuator rod engaged with the power transfer rod; and
a ball and screw assembly configured to move the actuator rod along the power shaft axis.

7. The linear friction welding system of claim 6, wherein:
the actuator rod defines an actuator rod axis; and
the actuator rod axis is coextensive with the power shaft axis.

8. The system of claim 1, further comprising:
a forge platen; and
a stiffening assembly configured to hydraulically clamp a component supported by the forge platen by generating a force along the welding axis.

9. A linear friction welding system comprising:
a power shaft defining a power shaft axis and including a first eccentric portion;
a crank including a second eccentric portion coupled with the first eccentric portion;
a ram operably coupled with the second eccentric portion and defining a welding axis;
a memory including program instructions; and
a controller operably connected to the memory, and configured to execute the program instructions to
control the phased relationship between the first eccentric portion and the second eccentric portion such that the ram does not vibrate along the welding axis while the power shaft is rotating by axially positioning a power transfer rod coupled to the power shaft and the crank along the power shaft axis,
establish a first pressure between two components to be welded after controlling the phased relationship such that the ram does not vibrate, and
modify the phased relationship such that the ram vibrates along the welding axis after the first pressure has been established.

10. The system of claim 9, wherein:
the crank includes a first groove which extends generally helically about a groove axis;
the groove axis is parallel to the power shaft axis; and
a first portion of the power transfer rod is positioned within the first groove.

11. The system of claim 10, wherein:
the power shaft defines a linear groove extending along the power shaft axis; and
a second portion of the power transfer rod is positioned within the linear groove.

12. The system of claim 11 wherein:
the crank includes a second groove which extends generally helically about the groove axis;
the linear groove extends completely through the power shaft; and
a third portion of the power transfer rod is positioned within the second groove.

13. The system of claim 12, wherein:
the first groove and the second groove are configured so as to provide a linear relationship between axial movement of the power transfer rod along the power shaft axis and ram vibration amplitude along the welding axis.

14. The system of claim 9, further comprising:
an actuator assembly including an actuator rod engaged with the power transfer rod, and a ball screw assembly configured to move the actuator rod along the power shaft axis.

15. The system of claim 14, wherein:
the actuator rod defines an actuator rod axis; and
the actuator rod axis is coextensive with the power shaft axis.

16. The system of claim 9, further comprising:
a forge platen; and
a stiffening assembly configured to hydraulically clamp a component supported by the forge platen by generating a force along the welding axis.

17. The system of claim 16, wherein the stiffening assembly comprises:
a first hydraulic cylinder spaced apart from the welding axis; and
a second hydraulic cylinder spaced apart from the welding axis.

18. The system of claim 17, wherein the stiffening assembly further comprises:
at least one first linear bearing; and
at least one second linear bearing, the at least one second linear bearing positionable at a location in opposition to the at least one first linear bearing such that the component is clamped between the at least one first linear bearing and the at least one second linear bearing.

19. The system of claim 18, wherein the at least one second linear bearing is supported by at least one pivotable stiffening arm.

20. The system of claim 16, wherein the stiffening assembly comprises:
a first hydraulic cylinder spaced apart from the welding axis;
a second hydraulic cylinder spaced apart from the welding axis;
at least one first linear bearing; and
at least one second linear bearing, the at least one second linear bearing positionable at a location in opposition to the at least one first linear bearing such that the component is clamped between the at least one first linear bearing and the at least one second linear bearing.

\* \* \* \* \*